United States Patent [19]

Kouno et al.

[11] Patent Number: 5,302,453

[45] Date of Patent: Apr. 12, 1994

[54] MOLECULAR ORIENTATION ARTICLES MOLDED FROM HIGH-MOLECULAR WEIGHT POLYETHYLENE AND PROCESSES FOR PREPARING SAME

[75] Inventors: Yasuo Kouno; Yuichi Itoh; Kazuo Yagi, all of Kuga, Japan

[73] Assignee: Mitsui Petrochemical Industries, Ltd., Tokyo, Japan

[21] Appl. No.: 68,100

[22] Filed: May 28, 1993

Related U.S. Application Data

[62] Division of Ser. No. 585,963, Sep. 21, 1990, Pat. No. 5,252,394.

[30] Foreign Application Priority Data

| Sep. 22, 1989 | [JP] | Japan | 1-247529 |
| Nov. 29, 1989 | [JP] | Japan | 1-310024 |
| Dec. 7, 1989 | [JP] | Japan | 1-318454 |
| Feb. 8, 1990 | [JP] | Japan | 2-29055 |
| Feb. 8, 1990 | [JP] | Japan | 2-29056 |

[51] Int. Cl.$^5$ .......................... D02G 3/00; D01D 5/08
[52] U.S. Cl. ................... 428/364; 428/373; 428/902; 264/210.8
[58] Field of Search ............. 428/364, 902, 373; 264/210.8, 210.7

[56] References Cited

U.S. PATENT DOCUMENTS 4,536,536  8/1985  Kavesh et al ................ 524/462

*Primary Examiner*—Patrick J. Ryan
*Assistant Examiner*—Richard C. Weisberger
*Attorney, Agent, or Firm*—Sherman and Shalloway

[57] ABSTRACT

In accordance with the present invention, there are provided high molecular weight polyethylene molecular orientation molded articles formed from high molecular weight polyethylenes having a weight average molecular weight of 300,000–600,000, said molecular orientation molded articles having a fineness of not more than 15 deniers, a tensile strength of more than at least 1.7 GPa and satisfying the tensile strength S (GPa)-weight average molecular weight M. (g/mol)-fineness D (denier) relationship represented by the formula [I]

$$\frac{M}{300,000} \times D^{-0.3} < S < \frac{M - 100,000}{10,000} \times D^{-1.08} \quad [I]$$

and processes for preparing the same.

Further in accordance with the present invention, there are also provided high molecular weight polyethylene molecular orientation molded articles formed from high molecular weight polyethylene having a weight average molecular weight of exceeding 600,000 and satisfying the relationship represented by the formula [II].

$$S > \left(\frac{M}{2 \times 10^6} + 3.0\right) \times D^{-0.074} \quad [II]$$

6 Claims, 1 Drawing Sheet

MOLECULAR ORIENTATION ARTICLES MOLDED FROM HIGH-MOLECULAR WEIGHT POLYETHYLENE AND PROCESSES FOR PREPARING SAME

This is a division of application Ser. No. 07/585,963 filed Sep. 21, 1990, now U.S. Pat. No. 5,252,394.

FIELD OF THE INVENTION

This invention relates to molecular orientation articles molded from high-molecular weight polyethylene and to processes for preparing the same, and more particularly to molecular orientation articles molded from high-molecular weight polyethylene, which are excellent in strength and which will scarcely deteriorate in tensile strength even when subjected to corona discharge treatment, and to processes for preparing the same.

BACKGROUND OF THE INVENTION

In the generic designation of polyethylene, there are involved commonly used polyethylene (general-purpose polyethylene) of a molecular weight of 50,000-200,000 or thereabouts, low-molecular weight polyethylene (so-called wax), high-molecular weight polyethylene and ultra-high-molecular weight polyethylene.

Of such polyethylene as referred to above, the ultra-high-molecular weight polyethylene generally has a molecular weight of more than 1,000,000 and possesses characteristics entirely different from those of general-purpose polyethylene. That is, because of extremely excellent characteristics such as impact resistance, abrasion resistance, chemical resistance and tensile strength, this ultra-high-molecular weight polyethylene has come to be newly used as engineering plastics, taking advantage of such characteristics as mentioned above.

The ultra-high-molecular weight polyethylene possesses such excellent characteristics on the one hand, but, on the other hand, has an extremely high intrinsic viscosity because of its high molecular weight. Accordingly, this ultra-high-molecular weight polyethylene is extremely low in flowability. In preparing molded articles form the ultra-high-molecular weight polyethylene, therefore, there is scarcely employed the extrusion molding or injection molding method used so far in the preparation of molded articles from general-purpose polyethylenes.

Where desired molded articles are prepared using such ultra-high-molecular weight polyethylene as illustrated above, there is adopted a method which comprises preparing in advance a mixture by adding a small amount of the ultra-high-molecular weight polyethylene to a diluent, and forming the resulting mixture into an article of a desired shape, followed by removing the diluent therefrom.

For example, Japanese Patent L-O-P No. 81612/1983 discloses a process for preparing filaments having a tensile strength of more than 1.5 GPa by using a solution containing not more than 20% by weight of an ethylene polymer or copolymer having a weight average molecular weight of more than 400,000, wherein the weight average molecular weight/number average molecular weight ratio (Mw/Mn) is less than 5, and at least 80% by weight of a solvent.

In the polyethylene solution used in this process, however, the upper limit of the polyethylene concentration as defined is 20% by weight, because the polyethylene used is high in molecular weight. Concretely, even such polyethylene as having a weight average molecular weight of 500,000 is used for preparing a solution of polyethylene, the polyethylene concentration of the resulting solution used is defined as low as 8% by weight. And, the filaments obtained by the use of such polyethylene solution as mentioned above come to have a tensile strength of about 1.9 GPa ($\overline{M}w/\overline{M}n=2.9$). Where filaments having a tensile strength of more than 2 GPa, the polyethylene used therefore must have a very high molecular weight such as about 1,100,000, and the polyethylene concentration of a solution containing such polyethylene as mentioned above is merely about 2% by weight.

Japanese Patent L-O-P Publn. No. 167010/1986 discloses a process for preparing polyethylene molded articles having a tenacity of at least 13 g/denier and a modulus of 350 g/denier by the use of a solution preparing by mixing polyethylene having a weight average molecular weight of 200,000-4,000,000 with a diluent. Basically, this process is technically identical with the process disclosed in the above-mentioned Japanese Patent L-O-P Publn. No. 81612/1983, and the polyethylene concentration of the polyethylene solution actually used is merely about 10% by weight.

In this manner, when molded articles are prepared from ultra-high-molecular weight polyethylenes, there must be used large amounts of the diluent, and it is difficult to improve markedly the working efficiency in the process for preparing the molded articles.

As stated above, when polyethylene fiber having an excellent tensile strength such as more than 1.5 GPa is intended to be prepared, the ultra-high-molecular weight polyethylene so far used therefore had a molecular weight of more than about 600,000, preferably more than 1,000,000. The reason therefor is that, because deterioration in tensile characteristics, especially tensile strength, has been considered to be attributable to structural defect in the terminal of molecule of the resulting fiber, the higher is the molecular weight of polyethylene, the higher is the strength of the resulting fiber. For example, Japanese Patent L-O-P Publn. No. 66316/1988 discloses a process for obtaining filaments excellent in tensile characteristics, which comprises preparing gel filaments from a dilute solution of ultra-high-molecular weight polyethylene having a molecular weight of more than 600,000, and stretching the resulting gel filaments. In this publication, actually used is the ultra-high-molecular weight polyethylene having a molecular weight reaching even about 1,500,000.

Japanese Patent L-O-P Publn. No. 187614/1984 also discloses a process for preparing polyethylene fiber, and according to the example of the process, the polyethylene fiber having a fiber diameter of 4.2 deniers and a strength of 3.16 GPa is obtained.

Furthermore, Japanese Patent L-O-P Publn. No. 240432/1985 discloses a process for preparing stretched articles excellent in tensile characteristics, which comprises melt kneading a mixture of ultra-high-molecular weight polyethylene having an intrinsic viscosity of more than 5 dl/g and an aliphatic hydrocarbon derivative, and then extruding the resulting kneadate through a die, followed by stretching. Concretely, it is reported according to this publication that the polyethylene fiber having a maximum tensile strength of 3.04 GPa is obtained from the ultra-high molecular weight having an intrinsic viscosity of 8.2 dl/g.

However, the higher is the molecular weight of polyethylene, the poorer is the moldability of the polyethylene. For example, where filaments excellent in tensile characteristics are intended to be prepared, when the molecular weight of the polyethylene increases higher and higher, and the solubility in solvent of the polyethylene decreases or the viscosity of the polyethylene solution as a given concentration becomes exceedingly high, with the result that the resulting filaments tend to break in the spinning or stretching step. Accordingly, when polyethylene having a very high molecular weight is used, it was necessary to lower the concentration of the polyethylene solution or slow down the spinning speed or stretching speed in order to avoid occurrence of such troubles as mentioned above. In this manner, fiber having excellent tensile characteristics can be obtained when the starting polyethylene used is higher in molecular weight, but on the other hand, because of poor moldability of the polyethylene having a higher molecular weight, a decrease in industrial productivity of the resulting fiber was unavoidable.

The ultra-high-molecular weight polyethylene having a very high molecular weight are liable to heat degradation at the time of molding thereof. On that account, a decrease in molecular weight to a certain degree is unavoidable at the time of preparing this starting polyethylene or at the time of spinning the same. Furthermore, it is considered that carbonyl group or the like formed at the time of heat degradation of the starting polyethylene will have an adverse effect on weathering properties of the resulting polyethylene fiber.

In this connection, polyethylene fiber high in tenacity is used mainly for making woven fabrics. Such woven fabrics are used concretely as reinforced textile fabrics, bulletproof fabrics and cut-protective clothes. For application of such polyethylene fiber in composite material reinforcing fiber, the advent of high tenacity polyethylene fiber smaller in fineness is desired from the standpoint of weave density and adhesion properties of the fiber at the time of weaving thereof, and for application of such polyethylene fiber in bulletproof fabrics and cut-protective clothes, the advent of polyethylene fiber excellent in tenacity and small in fineness is desired from the standpoint of bulletproofing properties and resistance to cutting and the advent of the polyethylene fiber excellent in touch and small in fineness is desired from the standpoint of a bodily sensation.

Molecular orientation articles molded from high molecular weight polyethylene are sometimes used as composite material reinforcing fiber in which excellent adhesion between the fiber and matrix is required. However, polyethylene is generally not so excellent in adhesion properties, and hence there are adopted various measures to improve the polyethylene in adhesion properties, and known as one of such measures is corona discharge treatment.

When molecular orientation articles molded from high molecular weight polyethylenes are subjected to corona discharge treatment, the thus treated articles sometimes deteriorated greatly in tensile strength, though they improved in adhesion properties.

The present inventors conducted extensive researches with the view of overcoming such drawbacks associated with high molecular weight polyethylenes as mentioned above, and eventually have accomplished the present invention on the basis of their finding that even from high molecular weight polyethylene having a weight average molecular weight of not more than 600,000 and excellent in moldability, there is obtained fine polyethylene fiber, i.e., a molecular orientation article formed from polyethylene, which hardly deteriorates in tensile strength and is excellent in tenacity even when said article is subjected to corona discharge treatment, by making finer said fine polyethylene fiber when it is formed from the high molecular weight polyethylene.

OBJECT OF THE INVENTION

The present invention has been made in the light of such circumstances as mentioned above, and an object of the invention is to provide molecular orientation articles formed from high molecular weight polyethylenes, for example, high molecular weight polyethylene fiber, which are excellent in moldability at the time of preparing the same, and which hardly deteriorate in tensile strength and are excellent in tenacity even when subjected to corona discharge treatment.

SUMMARY OF THE INVENTION

The first molecular orientation articles of the present invention which are formed from high molecular weight polyethylene having a weight average molecular weight of 300,000–600,000 are characterized in that the articles have a fineness of not more than 15 deniers, a tensile strength of at least 1.7 GPa and are capable of satisfying the tensile strength S (GPa)-weight average molecular weight M (g/mol)-fineness D (denier) relationship represented by the following formula [I]

$$\frac{M}{300,000} \times D^{-0.3} < S < \frac{M - 100,000}{10,000} \times D^{-1.08} \quad [I]$$

The second molecular weight orientation articles of the invention which are obtained by stretching high molecular weight polyethylenes having a weight average molecular weight of exceeding 600,000 are characterized in that the articles have a fineness of not more than 15 deniers and are capable of satisfying the tensile strength S (GPa)-weight average molecular weight M (g/mole)-fineness D (denier) relationship represented by the following formula [II].

$$S > \left(\frac{M}{2 \times 10^6} + 3.0\right) \times D^{-0.074} \quad [II]$$

The molecular orientation articles formed from high molecular weight polyethylenes of the present invention as illustrated above may be obtained by extruding a mixture of the polyethylene and a diluent through a die nozzle at a temperature at which the mixture is flowable and at a rate of shear of more than 20 sec$^{-1}$, while orienting the mixture within the die under application of a shear stress of from $1 \times 10^5$ to $8 \times 10^5$ dyn/cm$^2$ to obtain a polyethylene molded article having a degree of orientation of at least 0.7, followed by stretching.

DETAILED DESCRIPTION OF THE INVENTION

Figure 1:
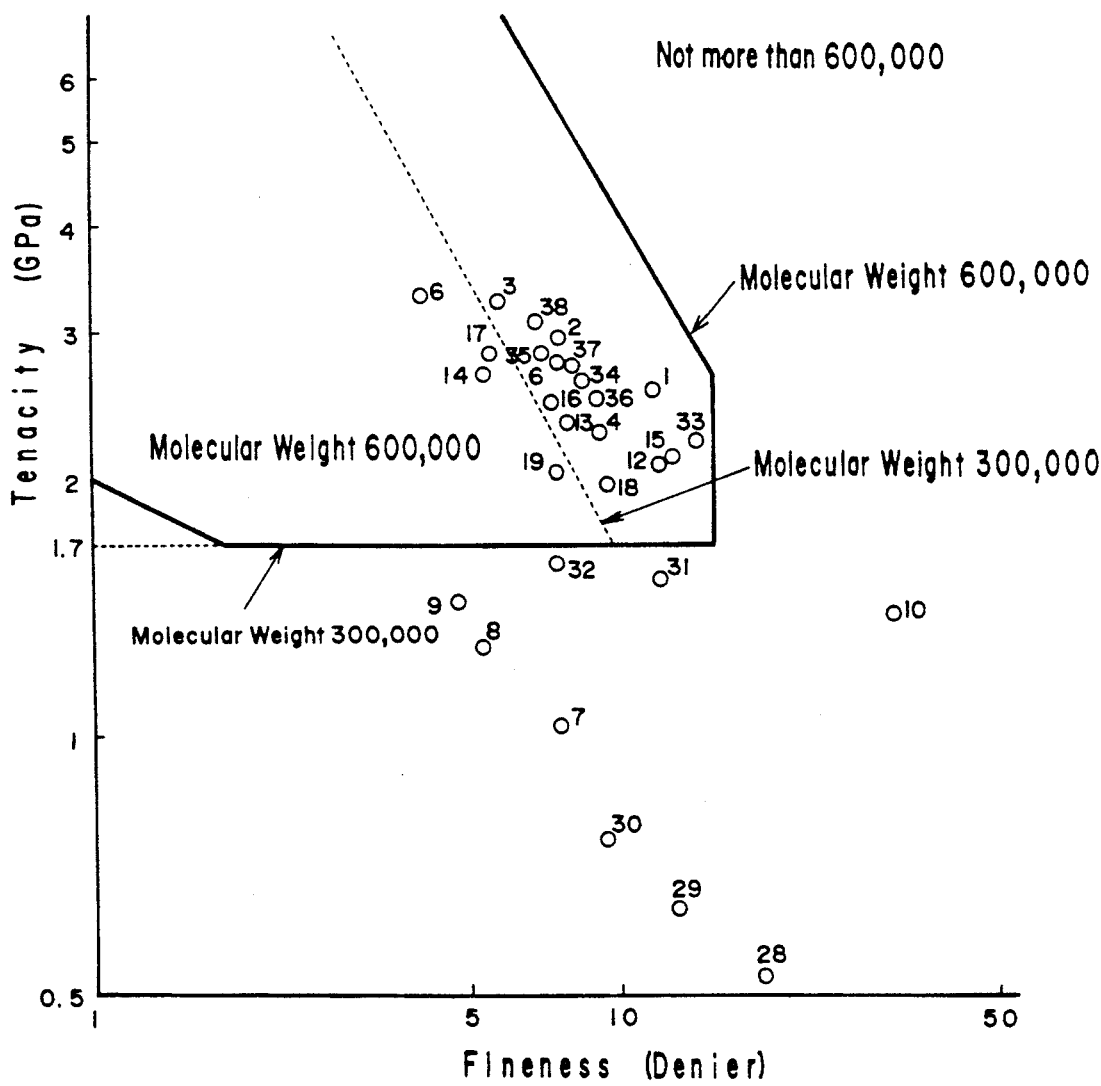
FIG. 1 is a graph showing the relationship between the fineness and tenacity of the high molecular weight polyethylene fiber obtained in examples (specimens 1–6 and 12–19) and in comparative examples (specimens 7–10).

The molecular orientation articles formed from high molecular weight polyethylenes of the present invention and processes for preparing the same are illustrated below in detail.

Starting polyethylene

The molecular orientation articles formed from high molecular weight polyethylenes of the invention may be prepared from high molecular weight polyethylenes having a weight average molecular weight of more than 300,000.

In particular, the first molecular orientation articles formed from high molecular weight polyethylenes of the invention are prepared from high molecular weight polyethylenes having a weight average molecular weight of 300,000–600,000, preferably 350,000–600,000 and especially 400,000–600,000.

The second molecular orientation articles formed from high molecular weight polyethylenes are prepared from high molecular weight polyethylenes having a weight average molecular weight of exceeding 600,000, preferably exceeding 600,000 but not more than 1,500,000 and especially 600,000–1,000,000.

The molecular weight of the high molecular weight polyethylenes used may be obtained by calculation from an intrinsic viscosity of the polyethylene as measured in decalin at 135° C., for example, the calculation based on the formula reported by R. Chaing in Journal of Polymer Science, vol.36, 91 (1959).

When the weight average molecular weight of the high molecular weight polyethylene used is less than 300,000, it is difficult to obtain therefrom a molecular orientation article having a tenacity of more than 1.7 GPa, and the resulting molecular orientation article tends to become poor in such properties as creep resistance and abrasion resistance.

The high molecular weight polyethylenes used in the present invention may be either homopolymer of ethylene or copolymer of ethylene and a small amount of α-olefin. When such copolymer of ethylene and a small amount of α-olefin is used, the ethylene content of the copolymer is usually more than 95 mol %, preferably more than 98 mol %.

The α-olefin used in the ethylene copolymer as referred to above includes usually α-olefins of 3–10 carbon atoms. Such α-olefins as used herein include concretely propylene, 1-butene, 3-methyl-1-butene, 1-pentene, 4-methyl-1-pentene, 1-hexene, 1-heptene, 1-octene, etc. In addition to the above-mentioned α-olefins, there may be used other copolymerizable components, for example, cyclic olefins, etc., so long as they do not mar characteristics of the polyethylenes used in the present invention.

Molecular orientation molded article

The first molecular orientation articles molded from high molecular weight polyethylenes of the present invention are composed of high molecular weight polyethylenes having a weight average molecular weight of 300,000–600,000, said articles having a fineness of not more than 15 deniers, preferably not more than 12 deniers and especially not more than 10 deniers, a tensile strength of at least more than 1.7 GPa, preferably more than 1.8 GPa and especially more than 2.0 GPa, and satisfying the tensile strength S (GPa)-weight average molecular weight M. (g/mol)/fineness (denier) relationship represented by the following formula 1]

$$\frac{M}{300,000} \times D^{-0.3} < S < \frac{M - 100,000}{10,000} \times D^{-1.08} \quad [1]$$

The first molecular orientation articles molded from the above-mentioned high molecular weight polyethylenes are desirably excellent in tensile modulus as well as in tensile strength, said tensile modulus being more than 20 GPa, preferably more than 40 GPa.

The second molecular orientation articles molded from high molecular weight polyethylenes of the invention are composed of high molecular weight polyethylenes having a weight average molecular weight of exceeding 600,000, said articles having a fineness of not more than 15 deniers, preferably not more than 12 and especially not more than 10 deniers, and satisfying the tensile strength S (GPa)-weight average molecular weight M (g/mol)-fineness D (denier) relationship represented by the following formula [II].

$$S > \left( \frac{M}{2 \times 10^6} + 3.0 \right) \times D^{-0.074} \quad [II]$$

The second molecular orientation articles molded from the above-mentioned high molecular weight polyethylenes of the invention are desirably excellent in tensile modulus as well as in tensile strength, said tensile modulus being more than 20 GPa, preferably more than 40 GPa.

In the molecular orientation articles molded from the high molecular weight polyethylenes as illustrated above, the degree of molecular orientation may be determined by X-ray diffraction method, birefringence method, polarization fluorescent method, etc. The molecular weight orientation molded articles of the present invention are desirably molecular oriented so that a degree of orientation measured by a half breadth as detailed by Y. Go and K. Kubo, Journal of Chemical Engineering, Vol.39, 992 (1939), that is, a degree of orientation F as defined by the following equation $$\text{Degree of orientation } F = \frac{90° - H/2}{90°}$$

wherein H is a half breadth (°) of intensity distribution curve along with Debye ring on a maximum paratope plane on the equatorial line, becomes more than 0.98, preferably 0.99.

Process for preparing molecular orientation article molded from high molecular weight polyethylene Hereinafter, the processes for preparing the molecular orientation articles molded from the high molecular weight polyethylene of the present invention are illustrated.

In the processes of the invention for preparing the above-mentioned molecular orientation molded articles, the aforementioned high molecular weight polyethylene is mixed with a diluent, and the resulting mixture is kneaded.

The diluent used herein includes solvents for high molecular weight polyethylene or various waxy substances having compatibility with high molecular weight polyethylene.

The solvents used herein include those having a boiling point higher than a melting point of the high molecular weight polyethylene used, preferably the boiling point higher than the melting point plus 20° C.

The solvents as referred to above include concretely aliphatic hydrocarbon solvents such as n-nonane, n-decane, n-undecane, n-dodecane, n-tetradecane, n-octadecane, liquid paraffin, kerosine, etc.; aromatic hydrocarbon solvents such as xylene, naphthalene, tetralin, butyl benzene, p-cymene, cyclohexyl benzene, diethyl benzene, pentyl benzene, dodecyl benzene, bicyclohexyl, decalin, methylnaphthalene, ethylnaphthalene, etc. or hydrogenated derivatives thereof; halogenated hydrocarbon solvents such as 1,1,2,2,-tetrachloroethane, pentachloroethane, hexachloroethane, 1,2,3-trichloropropane, dichlorobenzene, 1,2,4-trichlorobenzene, bromobenzene, etc.; and mineral oils such as paraffinic process oils, naphthenic process oils, aromatic process oils, etc.

The waxy substances used herein are desirably those having a melting point of higher than 25° C., though those which are liquid at ordinary temperature may also be used. By using as the diluents such waxy substances which are solid at room temperature as mentioned above, the polyethylene molded article having favorable degree of orientation is obtained, because the waxy substance contained in the high molecular weight polyethylene begins to solidify immediately after extrusion through the die nozzle of said polyethylene, whereby the state of orientation of the high molecular weight polyethylene oriented with in the die comes to be difficult to destroy and hence the thus attained molecular orientation tends to remain evidently in the resulting polyethylene molded article.

Such waxy substances as mentioned above are preferably aliphatic hydrocarbon compounds or derivatives of aliphatic hydrocarbon compounds, both of which are solid at room temperature.

The aliphatic hydrocarbon compounds used herein include paraffinic wax comprising saturated aliphatic hydrocarbon compounds having a molecular weight of usually not more than 2,000, preferably not more than 1,000 and especially not more than 800. Examples of these aliphatic hydrocarbon compounds include n-alkanes of more than 22 carbon atoms such as docosane, tricosane, tetracosane and triacontane, or mixtures of these n-alkanes and a minor proportion of lower n-alkanes; so-called paraffin wax obtained from petroleum by separation and purification, moderate low-pressure polyethylene wax, high-pressure polyethylene wax and ethylene copolymer wax which are all low molecular weight polymers of ethylene or low molecular weight copolymers of ethylene and other α-olefins, or wax obtained from polyethylenes such as moderate low-pressure polyethylenes and high-pressure polyethylenes, the molecular weight of which has been decreased by heat degradation or the like, and oxidation products of said wax, or maleic acid-modified oxidized wax or maleic acid-modified wax.

The derivatives of aliphatic hydrocarbon compounds used herein include, for example, fatty acid, aliphatic alcohol, fatty acid amide, fatty acid ester, aliphatic mercaptan, aliphatic aldehyde and aliphatic ketone, which are such compounds as having at the terminal or inside the aliphatic hydrocarbon group (alkyl or alkenyl) 1 or more, preferably 1-2 and especially 1 functional group such as carboxyl, hydroxyl, carbamoyl, ester, mercapto or carbonyl, and having more than 8 carbon atoms, preferably 12-50 carbon atoms or a molecular weight of 130-2,000, preferably 200-800.

Concretely, useful fatty acid includes capric acid, lauric acid, myristic acid, palmitic acid, stearic acid and oleic acid; aliphatic alcohol includes lauryl alcohol, myristyl alcohol, cetyl alcohol and stearyl alcohol; fatty acid amide includes caprin amide, laurin amide, palmitin amide and stearylamide; and fatty acid ester includes stearyl acetate, etc.

The mixing proportion (weight ratio) between polyethylene and the diluent varies according to the kind thereof, but is generally 15:85-80:20, preferably 20:80-60:40. When the amount of the diluent used is smaller than those defined above, the melt viscosity of the mixture becomes excessively high, thereby making difficult the melt kneading or melt molding thereof and, at the same time, surface roughening of the resulting extrusion molded article becomes conspicuous, and the extrusion molded article being under stretching tends to break. On the other hand, when the amount of the diluent used is in excess of those defined above, the above-mentioned mixture also finds difficulty in melt kneading thereof, and there is a tendency that the resulting extrusion molded article tends to become poor in stretchability. Furthermore, there is a tendency that the orientation within the die of the above-mentioned mixture being under extrusion tends to become difficult to occur.

The above-mentioned melt kneading is desirably carried out at a temperature of usually 150°-300° C., preferably 170°-270° C., and if it is carried out at a temperature below the lower limit of the above-mentioned temperature range, the melt viscosity becomes excessively high, and the melt extrusion molding tends to become difficult and, on the other hand, if it is carried out at a temperature above the upper limit of said temperature range, the molecular weight of the ultra-high-molecular weight ethylene copolymer decreases by heat degradation, and this tends to put a difficulty in obtaining a molded article high in modulus of elasticity as well as high in strength. The melt kneading may be carried out by dry blending using a Henschel mixer, V-blender or the like, or may be carried out using a single screw or multi-screw extruder.

The kneadate of the above-mentioned high molecular weight polyethylene and diluent is extruded through a spinneret to obtain a high molecular weight polyethylene molded article in its unstretched state. In order to obtain a molded article excellent in strength at that time, it is desirable that the shearing stress applied to the high molecular weight polyethylene at the spinning thereof is $1.0 \times 10^5$ dyn/cm$^2$ — $8 \times 10^5$ dyn/cm$^2$, preferably $2 \times 10^5$ dyn/cm$^2$ — $8 \times 10^5$ dyn/cm$^2$. At the time when the kneadate is extruded through the spinneret, the rate of shear is desirably more than 20 sec$^{-1}$, preferably more than 25 sec$^{-1}$ and especially more than 30 sec$^{-1}$. If the shearing stress becomes smaller than the lower limit of the above-defined range, it is not possible to impart an effective orientation within the die to the polyethylene and, on the other hand, if the shearing stress exceeds the upper limit of the above-defined range, turbulence flow such as melt fracture tends to occur. The upper limit of the rate of shear is usually not more than 200 sec$^{-1}$, preferably not more than 150 sec$^{-1}$.

A molten product as spun may also be drafted, that is, said product is extended in a molten state. The ratio of the extrusion speed Vo of a molten resin within the die to the take-up speed V of an unstretched product cooled and solidified may be defined as a draft ratio by the following equation.

Draft ratio = V/Vo

The draft ratio as defined above, though it depends on the temperature of the mixture and the molecular weight of the polyethylene, is usually more than 3, preferably more than 6.

In order to obtain a polyethylene molecular orientation article small in fineness (denier), it is effective to make the draft ratio relatively large.

The degree of orientation of the thus obtained polyethylene molded article is more than 0.7, preferably more than 0.8 and especially more than 0.9. This degree of orientation is determined by the aforementioned procedure.

The kneadate of the high molecular weight polyethylene and diluent is not intended to be molded only by extrusion molding technique, and when the kneadate is used for the preparation of various stretch molded containers, it is also possible to prepare therefrom by injection molding a preform for stretch blow molding. The resulting molded article may be cooled and solidified by force-drying means such as air-cooling, water-cooling, etc.

Subsequently, an unstretched molded article thus obtained from the high molecular weight polyethylene is subjected to stretching treatment, whereby a high molecular weight polyethylene molecular orientation molded article is obtained.

The polyethylene molded article thus obtained is stretched at a temperature of generally 40°–160° C., especially 80°–145° C. A heat medium used for maintaining the unstretched molded article at the temperature mentioned above includes air, water vapor or liquid medium. In that case, however, when the stretching operation is carried out by using as the heat medium a solvent capable of removing the diluent and having a boiling point higher than that of the molded article composition, in concrete, decalin, decane, kerosine, etc., it becomes possible to remove the diluent from said composition and, at the same time, to dissolve the problem of stretching irregularities and also to attain a high draw ratio.

Of course, the means of removing the diluent from polyethylene is not limited to the above-mentioned procedure, and the removal of the diluent may also be carried out by a procedure of treating an unstretched molded article with a solvent such as hexane, heptane, hot ethanol, chloroform or benzene, followed by stretching, or a procedure of treating a stretched molded article with a solvent such as hexane, heptane, hot ethanol, chloroform or benzene. In this manner, there can be obtained a high molecular weight polyethylene molecular orientation molded article having a high modulus of elasticity and a high strength.

The stretching operation may be carried out in a single stage or two stages or more. The draw ratio depends on the desired molecular orientation and on the effect of improving a melting temperature followed thereby, but it is desirable that the stretching operation is carried out so as to attain the draw ratio of usually 5–100 times, preferably 10–80 times.

In general, the extrusion molded article is advantageously stretched by the multi-stage stretching operation. In the first stage of the operation, the extrusion molded article is stretched at a relatively low temperature such as from 80° to 120° C. while extracting the diluent present therein with the solvent, and in the second or subsequent stage, the molded article is further stretched at a temperature of 120°–160° C. or a temperature higher than the temperature employed in the first stage.

When the polyethylene molded article is stretched in the manner as described above, there may be obtained a high molecular weight polyethylene molecular orientation molded article having a degree of orientation of more than 0.95, preferably more than 0.96 and more preferably more than 0.98, further preferably more than 0.99 and satisfying the relationship represented by the formula [I] when the high molecular weight polyethylene used has a molecular weight of 300,000–600,000, and a high molecular weight polyethylene molecular orientation molded article satisfying the relationship represented by the formula [II] when the high molecular weight polyethylene used has a molecular weight of exceeding 600,000.

The high molecular weight polyethylene molecular orientation molded articles obtained in this manner may be subjected, if desired, to heat treatment under the restraint conditions. This heat treatment is carried out at a temperature of usually 140°–180° C., especially 150°–175° C. for 1–20 minutes, especially 3–10 minutes. By this heat treatment, there may be brought about such advantages that crystallization of the stretched article further proceeds, melting temperature moves to a higher temperature side, strength and modulus of elasticity improve and creep resistance at high temperatures improves.

In the present invention, a molten mixture of the high molecular weight polyethylene and diluent is extrusion molded at a specific rate of shear and a specific shearing stress, whereupon a molecular orientation molded article is formed within the die to give a molecular orientation molded article excellent in mechanical strength in comparison with the case where said molten mixture is extrusion molded without using the specific rate of shear and shearing stress.

EFFECT OF THE INVENTION

The high molecular weight polyethylene molecular orientation molded articles of the present invention are excellent in mechanical strength and also capable of being made thin or fine. Utilizing such characteristics, the high molecular weight polyethylene molecular orientation molded articles of the invention are useful for the industrial textile materials such as high tenacity multifilament yarn, cord, rope, fabric and nonwoven fabric, and also for the packaging materials such as packaging tape, etc.

The high molecular weight polyethylene molecular orientation molded articles of the invention, when they are formed into filaments, may also be used as reinforcing fiber for various resins such as epoxy resin and unsaturated polyester, or for synthetic rubber, etc. Because of high tenacity and low density, these filaments possess the advantage of lightening the molded article reinforced therewith in comparison with conventional molded article reinforced with glass fiber, carbon fiber, boron fiber, aromatic polyamide fiber, aromatic polyimide fiber, etc. In the same manner as in making composite materials using glass fiber, the filaments of the invention can be used in the fabrication of UD (Unite Directional) laminated board, SMC (Sheet Molding Compound), BMC (Bulk Molding Compound), etc., and their expected uses in various composite materials are directed to the fields wherein light weight and high strength are required, such as automotive parts, structural materials for boat and yacht, substrates for electronic circuit, etc.

The high molecular weight polyethylene molecular orientation molded articles of the invention are greatly improved in adhesion properties even when subjected to corona discharge treatment, but the tensile strength thereof is hardly deteriorated.

The present invention is illustrated below with reference to examples, but it should be construed that the invention is in no way limited to those examples.

Example 1

A 30:70 by weight mixture of an ethylene/propylene copolymer (ethylene content 99.9%) having a molecular weight of $5.5 \times 10^5$ (an intrinsic viscosity as measured in decalin at 135° C. of 6.5 dl/g) and paraffin wax (m.p. 69° C., and a molecular weight of 490) was melt spun under the following conditions. First, this mixture was loaded with 0.1 part by weight, based on 100 parts by weight of the high molecular weight ethylene/propylene copolymer, of 3,5-dimethyl-tert-butyl-4-hydroxytoluene as a stabilizer. Subsequently, the mixture was melt kneaded at a preset temperature of 190° C. by means of a screw extruder, and successively the molten mixture as kneaded was melt spun through a spinning die of an orifice diameter of 2 mm attached to the extruder under the conditions of a rate of shear of 25 sec$^{-1}$, a shearing stress of $2.8 \times 10^5$ dyn/cm$^2$ and a die temperature of 180° C. The filaments thus spun were taken up at a draft ratio of 33 times and an air gap of 180 cm, cooled in the air and solidified to obtain unstretched filaments. The degree of orientation of the unstretched filaments as measured was 0.90.

The unstretched filaments thus obtained were stretched under the following conditions to obtain oriented filaments (specimens 1-3). That is, the abovementioned unstretched filaments were stretched in three stages using four pairs of godet rolls. In that case, the heat medium used in the first and second stretching baths was n-decane kept at a temperature of 110° C. and 120° C., respectively, and the heat medium used in the third stretching bath was triethylene glycol kept at a temperature of 143° C. An effective length of each bath was 50 cm. In practicing the stretching, the speed of rotation employed in the first godet roll was 0.5 m/min and the speed of rotation employed in the fourth godet roll was varied to obtain filaments having a desired draw ratio. The number of revolution employed in the second and the third godet rolls, respectively, was suitably selected within the range where the stable stretching can be made. The greater part of the paraffin wax mixed at the outset with the copolymer was extracted in the first and second stretching baths, respectively. The draw ratio was obtained by calculation from the ratio of speed of rotation of the first godet roll to the fourth godet roll.

Modulus of elasticity, tensile strength and elongation at break of the high molecular weight polyethylene filaments thus obtained were determined at room temperature (23° C.) by means of Tensilon RTM-100 Model tensile tester manufactured by Orientex K.K. In this case, the specimen length between clamps was 100 mm, and the rate of pulling was 100 mm/min. The modulus of elasticity was the initial modulus of elasticity which was obtained from an inclination of tangent line of the stress vs. strain curve. A cross-sectional area of the filament necessary for the calculation was obtained from the weight of filament, assuming that the density of the filament is 0.960 g/cc. A degree of orientation of the stretched filaments was also obtained.

Results obtained are shown in Table 1.

TABLE 1

| Specimen | Draw ratio times | Fineness denier | Tenacity GPa | Modulus of elasticity GPa | Elongation % | Degree of orientation F |
|---|---|---|---|---|---|---|
| 1 | 20 | 11.4 | 2.63 | 66.5 | 4.7 | 0.97 |
| 2 | 30 | 7.6 | 3.01 | 83.0 | 4.6 | 0.98 |
| 3 | 40 | 5.7 | 3.33 | 102.5 | 4.3 | 0.98 |

Example 2

A 30:70 by weight mixture of an ethylene/1-butene copolymer (ethylene content 99.9%) having a molecular weight of $5.4 \times 10^5$ (an intrinsic viscosity as measured in decalin at 135° C. of 6.1 dl/g) and the same paraffin wax as used in Example 1 was melt spun in the same manner as in Example 1 but using the die temperature of 170° C. The thus obtained unstretched filaments had a degree of orientation of 0.91. The unstretched filaments were stretched in the same manner as in Example 1 to obtain stretched filaments (specimens 4-5).

Results obtained are shown in Table 2.

TABLE 2

| Specimen | Draw ratio times | Fineness denier | Tenacity GPa | Modulus of elasticity GPa | Elongation % | Degree of orientation F |
|---|---|---|---|---|---|---|
| 4 | 25 | 9.0 | 2.40 | 69.7 | 4.4 | 0.97 |
| 5 | 30 | 7.4 | 2.74 | 78.1 | 4.1 | 0.98 |

Example 3

A 30:70 by weight mixture of high molecular weight polyethylene having a molecular weight of $4.7 \times 10^5$ (an intrinsic viscosity as measured in decalin at 135° C. of 5.8 dl/g) and the same paraffin wax as used in Example 1 was melt spun in the same manner as in Example 1 to obtain unstretched filament. In that case, the draft ratio used was 50 times. The thus obtained unstretched filament had a degree of orientation of 0.90. The unstretched filament was then stretched in the same manner as in Example 1 to obtain stretched filament (specimen 6).

Results obtained are shown in Table 3.

TABLE 3

| Specimen | Draw ratio times | Fineness denier | Tenacity GPa | Modulus of elasticity GPa | Elongation % | Degree of orientation F |
|---|---|---|---|---|---|---|
| 6 | 40 | 4.2 | 3.32 | 110.8 | 3.8 | 0.98 |

Comparative Example 1

A 30:70 by weight mixture of polystyrene having a molecular weight $2.5 \times 10^5$ (an intrinsic viscosity as measured in decalin at 135° C. of 3.7 dl/g) and the same paraffin wax as used in Example 1 was melt spun in the same manner as in Example 1 to obtain unstretched filaments. The thus obtained unstretched filaments had a degree of orientation of 0.85. The unstretched filaments were then stretched in the same manner as in Example 1 to obtain stretched filaments (specimens 7-9).

Results obtained are shown in Table 4.

TABLE 4

| Specimen | Draw ratio times | Fineness denier | Tenacity GPa | Modulus of elasticity GPa | Elongation % | Degree of orientation F |
|---|---|---|---|---|---|---|
| 7 | 30 | 7.6 | 1.03 | 30.2 | 6.3 | 0.96 |
| 8 | 40 | 5.3 | 1.28 | 41.7 | 4.3 | 0.96 |
| 9 | 50 | 4.7 | 1.44 | 52.3 | 3.8 | 0.97 |

Comparative Example 2

A 30:70 by weight mixture of the same polyethylene as used in Example 1 and the same paraffin wax as used in Example 1 was melt spun in the same manner as in Example 1 but using a spinning die of an orifice diameter of 4 mm. The temperature of the die used in this case was 170° C. The thus obtained unstretched filament had a degree of orientation of 0.88. The unstretched filament was then stretched in the same manner as in Example 1 to obtain stretched filament (specimen 10).

Results obtained are shown in Table 5.

TABLE 5

| Specimen | Draw ratio times | Fineness denier | Tenacity GPa | Modulus of elasticity GPa | Elongation % | Degree of orientation F |
|---|---|---|---|---|---|---|
| 10 | 25 | 31.5 | 1.39 | 44.7 | 5.2 | 0.96 |

Comparative Example 3

A 30:70 by weight mixture of an ethylene/propylene copolymer (ethylene content 99.9%) having a molecular weight of $1.2 \times 10^6$ (an intrinsic viscosity as measured in decalin at 135° C. of 11.2 dl/g) and the same paraffin wax as used in Example 1 was melt spun in the same manner as in Example 1 but employing the die temperature of 190° C. In that case, when the die temperature employed was a temperature below 190° C., the spinning operation was difficult to carry out because the kneadate was excessively high in viscosity.

The unstretched filament thus obtained was then stretched in the same manner as in Example 1, whereupon the filament (specimen 11) obtained was liable to break, and the standard stretching of more than 10 times was inoperable.

The tensile strength S-weight average molecular weight M-fineness D in the high molecular weight polyethylene filaments obtained in the foregoing examples are shown in Table 6.

Spinnable properties and stretchability at the time of preparing the high molecular weight polyethylene filaments in the foregoing examples and comparative examples were evaluated.

Results obtained are shown in Table 6.

Furthermore, the fineness (denier)-tenacity (GPa) relationship in the high molecular weight polyethylene filaments obtained in the examples (specimens 1-6) and comparative examples (specimens 7-10) are shown in FIG. 1 wherein the numerals show the specimen number.

TABLE 6

| | $\frac{M}{300,000} \times D^{-0.3}$ | Tenacity S (GPa) | $\frac{M - 100,000}{10,000} \times D^{-1.08}$ | Spinnable Properties | Stretchability |
|---|---|---|---|---|---|
| Specimen 1 | 0.88 | 2.63 | 3.18 | ⊙ | ⊙ |
| Specimen 2 | 1.00 | 3.01 | 5.03 | ⊙ | ⊙ |
| Specimen 3 | 1.09 | 3.33 | 6.87 | ⊙ | ⊙ |
| Specimen 4 | 0.93 | 2.40 | 4.10 | ⊙ | ⊙ |
| Specimen 5 | 0.99 | 2.74 | 5.07 | ⊙ | ⊙ |
| Specimen 6 | 1.02 | 3.32 | 7.85 | ⊙ | ⊙ |
| Specimen 7 | 0.45 | 1.03 | 1.67 | ⊙ | ⊙ |
| Specimen 8 | 0.51 | 1.28 | 2.48 | ○ | ⊙ |
| Specimen 9 | 0.52 | 1.44 | 2.82 | ⊙ | ○ |
| Specimen 10 | 0.65 | 1.39 | 1.08 | ○ | ○ |
| Specimen 11 | — | — | — | △ | X |

⊙: Very good.
○: Good.
△: Fairly possible.
X: Difficult

Example 4

A 30:70 by weight mixture of an ethylene/propylene copolymer (ethylene content 99.9%) having an intrinsic viscosity as measured in decalin at 135° C. of 5.6 dl/g and a molecular weight of $4.5 \times 10^5$ and paraffin wax (m.p 69° C., molecular weight of 490) was melt spun under the following conditions. First, this mixture was loaded with 0.1 part, based on 100 parts by weight of the ethylene/propylene copolymer, of 3,5-dimethyl-tert-butyl-4-hydroxytoluene as a process stabilizer.

Subsequently, the mixture was melt kneaded at a preset temperature of 190° C. by means of a screw extruder, and successively melt spun through a spinning die of an orifice diameter of 2 mm attached to the extruder at a rate of shear of 25 sec$^{-1}$, a shearing stress of $2.6 \times 10^5$ dyn/cm$^2$ and a die temperature of 180° C. In this case, the filaments thus spun were taken up at an air gap of 180 cm and a draft ratio of 33 times, cooled in the air and solidified to obtain unstretched filaments. The degree of orientation F as measured of the unstretched filaments was 0.9.

The unstretched filaments thus obtained were then stretched under the same conditions as in Example 1 to obtain stretched filaments (specimens 12-14) which were then put to the same tests as in Example 1.

Results obtained are shown in Table 7.

TABLE 7

| Specimen | Draw ratio times | Fineness denier | Tenacity GPa | Modulus of elasticity GPa | Elongation % | Degree of orientation F |
|---|---|---|---|---|---|---|
| 12 | 20 | 11.6 | 2.15 | 65.3 | 4.5 | 0.96 |
| 13 | 30 | 7.7 | 2.41 | 81.6 | 4.3 | 0.97 |
| 14 | 40 | 5.6 | 2.69 | 93.8 | 4.1 | 0.98 |

Example 5

The same mixture as used in Example 4 was spun and stretched under the same conditions as employed in Example 4 to obtain stretched filaments (specimens 15-19) but using a rate of shear of 41 sec$^{-1}$, a shearing stress of $3.1 \times 10^5$ dyn/cm$^2$ and a die temperature of 170° C. The unstretched filaments had a degree of orientation F of 0.93. The stretched filaments thus obtained were put to the same tests as in Example 4.

Results obtained are shown in Table 8.

TABLE 8

| Specimen | Draw ratio times | Fineness denier | Tenacity GPa | Modulus of elasticity GPa | Elongation % | Degree of orientation F |
|---|---|---|---|---|---|---|
| 15 | 20 | 11.8 | 2.20 | 69.5 | 4.3 | 0.96 |
| 16 | 30 | 7.5 | 2.52 | 85.1 | 3.9 | 0.97 |
| 17 | 40 | 5.7 | 2.85 | 98.8 | 3.6 | 0.98 |

Example 6

A 30:70 by weight mixture of an ethylene/1-butene copolymer (ethylene content 99.8%) having an intrinsic viscosity as measured in decalin at 135° C. of 5.7 dl/g and a molecular weight of $4.6 \times 10^5$ and the same paraffin wax as used in Example 4 was melt spun in the same manner as in Example 4 but using a rate of shear of 33 sec$^{-1}$, a shearing stress of $2.9 \times 10^5$ dyn/cm$^2$ and a die temperature of 170° C. to obtain unstretched filaments having a degree of orientation F of 0.91. The unstretched filaments thus obtained were stretched in the same manner as in Example 4 to obtain stretched filaments (specimens 18-19) which were then put to the same tests as in Example 4.

Results obtained are shown in Table 9.

TABLE 9

| Specimen | Draw ratio times | Fineness denier | Tenacity GPa | Modulus of elasticity GPa | Elongation % | Degree of orientation F |
|---|---|---|---|---|---|---|
| 18 | 25 | 9.4 | 2.00 | 72.2 | 4.0 | 0.96 |
| 19 | 30 | 7.6 | 2.06 | 75.7 | 3.9 | 0.97 |

The tensile strength S-weight average molecular weight M-fineness D relationship in the high molecular weight polyethylene filaments obtained in the foregoing examples are shown in Table 10.

Furthermore, spinnable properties and stretchability at the time of preparing the high molecular weight polyethylene filaments in the foregoing examples were evaluated.

The fineness (denier)-tenacity (GPa) relationship in the high molecular weight polyethylene filaments obtained in the examples (specimens 12-19) is shown in FIG. 1 wherein the numerals show the specimen number.

TABLE 10

| | $\dfrac{M}{300,000} \times D^{-0.3}$ | Tenacity S (GPa) | $\dfrac{M - 100,000}{10,000} \times D^{-1.08}$ | Spinnable Properties | Stretchability |
|---|---|---|---|---|---|
| Specimen 12 | 0.72 | 2.15 | 2.47 | ☉ | ○ |
| Specimen 13 | 0.81 | 2.41 | 3.84 | ☉ | ○ |
| Specimen 14 | 0.89 | 2.69 | 5.41 | ☉ | ○ |
| Specimen 15 | 0.71 | 2.20 | 2.42 | ○ | ○ |
| Specimen 16 | 0.82 | 2.52 | 3.95 | ○ | ○ |
| Specimen 17 | 0.89 | 2.85 | 5.31 | ○ | ○ |
| Specimen 18 | 0.78 | 2.00 | 3.19 | ○ | ○ |

TABLE 10-continued

| | $\frac{M}{300,000} \times D^{-0.3}$ | Tenacity S (GPa) | $\frac{M - 100,000}{10,000} \times D^{-1.08}$ | Spinnable Properties | Stretchability |
|---|---|---|---|---|---|
| Specimen 19 | 0.83 | 2.06 | 4.02 | ⊙ | ⊙ |

⊙: Very good

Example 7

The specimen 3 prepared in Example 1 was subjected to corona discharge treatment one time at a dose of 75 w/m² min by means of a corona discharge treatment equipment manufactured by Tomoe Kogyo K.K., presetting a distance between bar-like electrodes to 1.0 mm. Tensile strength of the filament thus treated was 3.16 GPa (retention of tensile strength 95%).

Comparative Example 4

A 5:95 by weight mixture of polyethylene having a molecular weight of $2.2 \times 10^6$ (an intrinsic viscosity as measured in decalin at 135° C. of 17.0 dl/g) and decalin was melt spun under the following conditions.

First, the mixture was loaded with 0.1 part, based on 100 parts by weight of the mixture, of 3,5-dimethyl-tert-butyl -4-hydroxytoluene as a process stabilizer, poured into a separable flask sealed with nitrogen, and stirred by heating at 180° C. for 1 hour to obtain a homogeneous solution.

The solution was then poured in a spinning pot, allowed to stand at a temperature of 180° C. for 2 hours, and the solution was defoamed. The solution was then extruded through a spinning die of a 2 mm diameter without applying draft of not more than 2 times into a coagulation bath (water bath) positioned 30 cm under the die to obtain a gel-like filament. The gel-like filament was taken up on a bobbin at a rate of 1 m/min, and the bobbin was immersed at room temperature in a bath containing n-hexane to replace the decalin, i.e. the liquid component of the gel-like filament, with n-hexane. The bobbin was taken out from the n-hexane bath and thoroughly dried at 50° C. in vacuo.

The thus dried filament was introduced into hot tubes at a rate of 50 cm/min, and stretched in three stages using four godet rolls. The effective length of each hot tube was 50 cm, and at that time the temperatures within the first, second and third hot tubes were 110° C., 130° C. and 140° C., respectively. The draw ratio was 60 times when obtained from the ratio of revolution of the first gode roll to the fourth godet roll. The rotational speed of the second and third godet rolls was suitably selected from the range within which a steady operation can be made. The polyethylene filament thus obtained had an intrinsic viscosity of 14.0 dl/g, a fineness of 21 deniers and a tensile strength of 2.85 GPa.

The polyethylene filament was then subjected to corona discharge treatment under the same conditions as in Example 7. The tensile strength of the filament after the treatment was 1.75 GPa (retention of tensile strength of 61%).

Example 8

A 20:80 by weight mixture of an ethylene/propylene copolymer (ethylene content 99.8%) having a molecular weight of $7.8 \times 10^5$ (an intrinsic viscosity as measured in decalin at 135° C. of 8.3 dl/g) and the same paraffin wax as used in Example 1 was melt spun under the same conditions as employed in Example 1 but using a rate of shear of 33 sec$^{-1}$, a shearing stress of $2.3 \times 10^{-5}$ and a draft ratio of 46 times to obtain unstretched filaments having a degree of orientation of 0.92.

The unstretched filaments thus obtained were stretched under the same conditions as employed in Example 1 to obtain stretched filaments (specimens 20-23) which were then put to the same tests as in Example 1.

Results obtained are shown in Table 11.

TABLE 11

| Specimen | Draw ratio times | Fineness denier | Tenacity GPa | Modulus of elasticity GPa | Elongation % | Degree of orientation F |
|---|---|---|---|---|---|---|
| 20 | 30 | 4.2 | 3.09 | 81.5 | 4.6 | 0.97 |
| 21 | 40 | 3.2 | 3.51 | 96.6 | 4.3 | 0.98 |
| 22 | 50 | 2.5 | 3.89 | 122.1 | 4.2 | 0.98 |
| 23 | 55 | 2.2 | 4.12 | 131.3 | 4.0 | 0.99 |

Example 9

A 20:80 by weight mixture of an ethylene/1-butene copolymer (ethylene content 99.9%) having a molecular weight of $1.11 \times 10^6$ (an intrinsic viscosity as measured in decalin at 135° C. of 10.6 dl/g) and the same paraffin was as used in Example 8 was melt spun in the same manner as in Example 8 but using a rate of shear of 25 sec$^{-1}$, a shearing stress of $2.8 \times 10^5$ dyn/cm² and a die temperature of 190° C. to obtain unstretched filaments having a degree of orientation of 0.92.

The unstretched filaments thus obtained were stretched in the same manner as in Example 8 to obtain stretched filaments (specimens 24-26).

Results obtained are shown in Table 12.

TABLE 12

| Specimen | Draw ratio times | Fineness denier | Tenacity GPa | Modulus of elasticity GPa | Elongation % | Degree of orientation F |
|---|---|---|---|---|---|---|
| 24 | 32 | 5.2 | 3.24 | 80.3 | 4.5 | 0.97 |
| 25 | 40 | 4.2 | 3.65 | 102.7 | 4.3 | 0.98 |
| 26 | 50 | 3.4 | 4.02 | 120.9 | 4.1 | 0.99 |

The tensile strength S-weight average molecular weight M-fineness D relationship in the high molecular weight polyethylene filaments (specimens 20-26) obtained in Examples 8 and 9 are shown in Table 13.

TABLE 13

| | $\left(\dfrac{M}{2 \times 10^6} + 3.0\right) \times D^{-0.074}$ (GPa) | Strength S (GPa) |
|---|---|---|
| Specimen 20 | 3.08 | 3.09 |
| Specimen 21 | 3.11 | 3.46 |
| Specimen 22 | 3.17 | 3.83 |
| Specimen 23 | 3.20 | 4.12 |
| Specimen 24 | 3.15 | 3.24 |
| Specimen 25 | 3.20 | 3.61 |
| Specimen 26 | 3.25 | 4.02 |

Example 10

The polyethylene filament of the specimen 21 prepared in Example 8 was subjected to corona discharge treatment under the same conditions as employed in Example 7. The tensile strength as measured after the treatment of the fiber was 3.30 GPa (retention of tensile strength of 94%).

Example 11

A 20:80 by weight mixture of high molecular weight polyethylene having an intrinsic viscosity as measured in decalin at 135° C. of 7.4 dl/g (a molecular weight of $6.7 \times 10^5$) and the same paraffin wax as used in Example 4 but using a draft ratio of 40, a rate of shear of 41 sec$^{-1}$ and a shearing stress of $2.5 \times 10^5$ dyn/cm$^2$. The unstretched filament thus obtained had a degree of orientation of F of 0.94. This unstretched filament was stretched by the method as described in Example 4 to obtain a stretched filament (specimen 27).

Tensile characteristics of the stretched filament thus obtained are shown in Table 14-A.

The tensile strength S-weight average molecular weight M-fineness D relationship in the high molecular weight polyethylene filaments (Specimen 27) obtained in Example 11 is shown in Table 14-B.

paraffin wax as used in Example 4 was melt spun under the same conditions as employed in Example 5 but using a rate of shear of 25 sec$^{-1}$ and a shearing stress of $1.9 \times 10^5$ dyn/cm$^2$. The unstretched filaments thus obtained had a degree of orientation F of 0.85. The unstretched filaments were then stretched by the method as described in Example 4 to obtain stretched filaments (Specimens 28-30).

Tensile characteristics of the stretched filaments thus obtained are shown in Table 15.

The tensile strength S-weight average molecular weight M-fineness D in the high molecular weight polyethylene filaments obtained in Comparative Example 5 are shown in Table 19.

Comparative Example 6

A 30:70 by weight mixture of polystylene having an intrinsic viscosity as measured in decalin at 135° C. of 5.6 dl/g (a molecular weight of $4.5 \times 10^5$) and the same paraffin was as used in Example 4 was melt spun under the same condition as employed in Example 4 but using a rate of shear of 10 sec$^{-1}$ and a shearing stress of $1.5 \times 10^5$ dyn/cm$^2$. The unstretched filaments thus obtained had a degree of orientation F of 0.88. The unstretched filaments were then stretched by the method as described in Example 4 to obtain stretched filaments (specimens 31-32).

Tensile characteristics of the stretched filaments thus obtained are shown in Table 16.

The tensile strength S-weight average molecular weight M-fineness D in the high molecular weight polyethylene filaments (specimens 31-32) obtained in Comparative Example 6 are shown in Table 19.

TABLE 14-A

| Specimen | Draw ratio times | Fineness denier | Tenacity GPa | Modulus of elasticity GPa | Elongation % | Degree of orientation F |
|---|---|---|---|---|---|---|
| 27 | 30 | 7.2 | 3.10 | 112.2 | 3.3 | 0.98 |

TABLE 14-B

| | $\left(\dfrac{M}{2 \times 10^6} + 3.0\right) \times D^{-0.074}$ (GPa) | Tenacity S (GPa) |
|---|---|---|
| Specimen 27 | 2.88 | 3.10 |

TABLE 15

| Specimen | Draw ratio times | Fineness denier | Tenacity GPa | Modulus of elasticity GPa | Elongation % | Degree of orientation F |
|---|---|---|---|---|---|---|
| 28 | 20 | 19.3 | 0.53 | 20.3 | 6.6 | 0.94 |
| 29 | 30 | 12.8 | 0.64 | 31.8 | 5.8 | 0.95 |
| 30 | 40 | 9.4 | 0.74 | 39.6 | 4.9 | 0.95 |

Comparative Example 5

A 50:50 by weight mixture of polyethylene having an intrinsic viscosity as measured in decalin at 135° C. of 2.8 dl/g (a molecular weight of $1.7 \times 10^5$) and the same

TABLE 16

| Specimen | Draw ratio times | Fineness denier | Tenacity GPa | Modulus of elasticity GPa | Elongation % | Degree of orientation F |
|---|---|---|---|---|---|---|
| 31 | 20 | 11.8 | 1.56 | 47.0 | 8.5 | 0.96 |
| 32 | 30 | 7.6 | 1.63 | 64.2 | 6.6 | 0.96 |

Example 12

A 35:65 by weight mixture of an ethylene/4-methyl-1-pentene copolymer (ethylene content 99.9%) having an intrinsic viscosity as measured in decalin at 135° C. of 6.9 dl/g and the same paraffin wax as used in Example 1 was melt spun under the same conditions as employed in Example 1 but using a rate of shear of 33 sec$^{-1}$, a shearing stress of $5.2 \times 10^5$ dyn/cm$^2$, a die temperature of 170° C. and a draft ratio of 60. The unstretched filaments thus obtained had a degree of orientation F of 0.94. The unstretched filaments were then stretched by the method as described in Example 1 to obtain stretched filaments (Specimens 33-35). Tensile characteristics of the stretched filaments thus obtained are shown in Table 17.

The tensile strength S-weight average molecular weight M-fineness D in the high molecular weight polyethylene filaments (Specimens 33-35) obtained in Example 12 are shown in Table 19.

TABLE 17

| Specimen | Draw ratio times | Fineness denier | Tenacity GPa | Modulus of elasticity GPa | Elongation % | Degree of orientation F |
|---|---|---|---|---|---|---|
| 33 | 10 | 13.6 | 2.30 | 47.3 | 6.4 | 0.96 |
| 34 | 15 | 8.7 | 2.64 | 71.0 | 5.4 | 0.97 |
| 35 | 20 | 7.0 | 2.82 | 95.8 | 4.2 | 0.97 |

Example 13

The polyethylene filament of the Specimen 27 prepared in Example 11 was subjected to corona discharge treatment under the same conditions as employed in Example 7. The tensile strength as measured after the treatment of the fiber was 2.92 GPa (retention of tensile strength of 94%).

Example 14

A 40:60 by weight mixture of high molecular weight polyethylene having a molecular weight of $5.0 \times 10^5$ (an intrinsic viscosity as measured in decalin at 135° C. of 6.0 dl/g) and the same paraffin was as used in Example 1 was melt spun under the same conditions as employed in Example 1 but using a draft ratio of 60 and a die temperature of 170° C. The resulting unstretched filaments have a degree of orientation of 0.91.

The unstretched filaments thus obtained were stretched in the same manner as in Example 1 to obtain stretched filaments (Specimens 36-38).

Results obtained are shown in Table 18.

The tensile strength S-weight average molecular weight M-fineness D in the high molecular weight polyethylene filaments (Specimens 36-38) obtained in Example 14 are shown in Table 19.

TABLE 18

| Specimen | Draw ratio times | Fineness denier | Tenacity GPa | Modulus of elasticity GPa | Elongation % | Degree of orientation F |
|---|---|---|---|---|---|---|
| 36 | 15 | 8.9 | 2.54 | 58.4 | 5.5 | 0.96 |
| 37 | 20 | 7.6 | 2.73 | 70.3 | 5.1 | 0.97 |
| 38 | 25 | 6.4 | 3.08 | 79.6 | 4.8 | 0.97 |

TABLE 19

| | | $\dfrac{M}{300,000} \times D^{-0.3}$ | Tenacity S (GPa) | $\dfrac{M - 100,000}{10,000} \times D^{-1.08}$ |
|---|---|---|---|---|
| Comparative Example 5 | Specimen 28 | 0.31 | 0.53 | 0.78 |
| | Specimen 29 | 0.35 | 0.64 | 1.16 |
| | Specimen 30 | 0.36 | 0.74 | 1.32 |
| Comparative Example 6 | Specimen 31 | 0.72 | 1.56 | 2.43 |
| | Specimen 32 | 0.82 | 1.63 | 3.92 |
| Example 12 | Specimen 33 | 0.90 | 2.30 | 2.92 |
| | Specimen 34 | 1.03 | 2.64 | 4.74 |
| | Specimen 35 | 1.10 | 2.82 | 6.00 |
| Example 14 | Specimen 36 | 0.87 | 2.54 | 3.77 |
| | Specimen 37 | 0.91 | 2.73 | 4.47 |
| | Specimen 38 | 0.95 | 3.08 | 6.73 |

What is claimed is:

1. A filament obtained by melt-spinning a polyolefin article composed of a mixture of a high molecular weight polyethlene having a weight average molecular weight exceeding 600,000 and a solid waxy substance under the application of shearing stress, stretching the polyolefin article, and removing the solid waxy substance therefrom, wherein said filament has a fineness of not more than 15 deniers and satisfies the tensile strength S (GPa)-weight average molecular weight M (g/mol)-fineness D (denier) relationship represented by the following formula [II].

$$S > \left( \frac{M}{2 \times 10^6} + 3.0 \right) \times D^{-0.074} \quad \text{[II]}$$

2. The filament as claimed in claim 1, wherein the fineness is not more than 10 deniers.

3. The filament as claimed in claim 1, wherein said filament has a retention in tensile strength of more than 90% after being subjected to a corona discharge treatment at a dose of 75 W/m$^2$. min.

4. The filament as claimed in claim 1, wherein said filament has a retention in tensile strength of not less than 94% after being subjected to a corona discharge treatment at a dose of 75 W/m$^2$. min.

5. The filament as claimed in claim 1, wherein said high molecular weight polyethylene has a weight average molecular weight of more than 600,000 to 1,110,000.

6. The filament as claimed in claim 1, wherein said high molecular weight polyethylene has a weight average molecular weight of more than 600,000 to 1,000,000.

* * * * *